Figure 1:
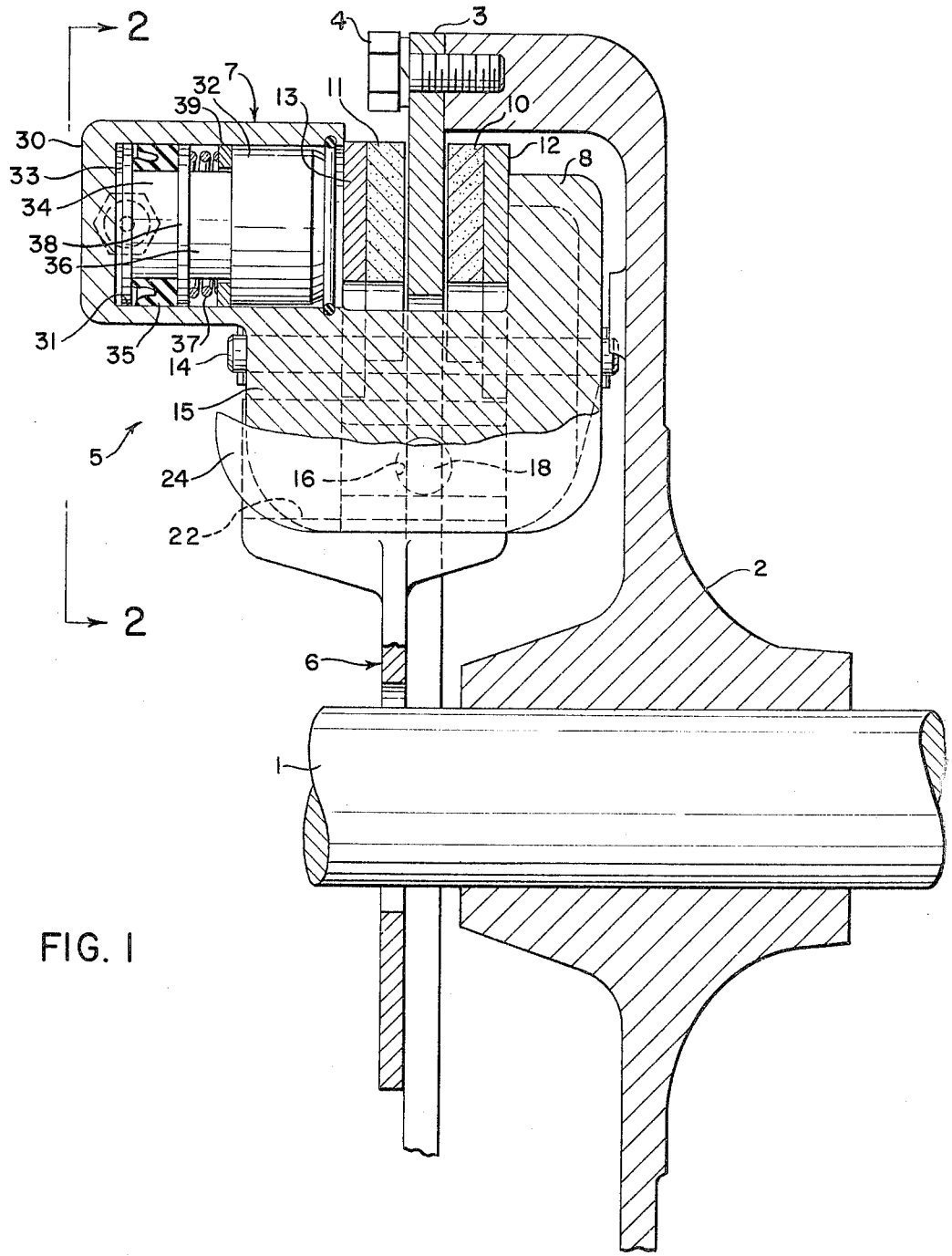

Dec. 13, 1966  O. J. ROSANOWSKI ETAL  3,291,262
SPOT TYPE DISC BRAKE
Filed Feb. 11, 1965  2 Sheets-Sheet 1

INVENTORS.
OSWALD JOSEF ROSANOWSKI &
HORST HANIGCK
BY
Gordon C. Mack
ATTORNEY

INVENTORS.
OSWALD JOSEF ROSANOWSKI
& HORST HANIGCK
BY
Gordon C. Mack
ATTORNEY

United States Patent Office 3,291,262
Patented Dec. 13, 1966

3,291,262
SPOT TYPE DISC BRAKE
Oswald Josef Rosanowski, Haus 161, Lindau-Rehlings, and Horst Hanigck, 1 Senftenau, Lindau, Germany
Filed Feb. 11, 1965, Ser. No. 431,943
8 Claims. (Cl. 188—73)

This is a continuation-in-part of application Serial No. 257,951, filed February 12, 1963, now Patent No. 3,213,969.

This invention relates to brakes of the disc type wherein a plurality of braking surfaces engage the rotating disc on opposite sides thereof. Brakes of the general type herein disclosed have been used in conjunction with heavy vehicles where increased braking power is mandatory. Specifically, this invention relates to a disc brake that is self-adjusting and self-aligning and is provided with automatic wear compensating structure to assure the continued self-alignment and adjustment of the brake throughout its life.

A known brake design utilizes a plate disc extending radially outwardly from the rotating shaft with primary and secondary brake pads mounted on a common support which extends around the outer periphery of the disc. In this type of brake design, the mounting of the brake pads has become extremely critical; thus, it is necessary to insure that the pads are properly aligned with the rotating disc so as to engage the disc over its full periphery and thereby obtain good wear characteristics. Also, it is necessary to insure that the pads are freely movable into engagement with the disc and will not bind and cause a complete failure of the brake.

Another problem has been the necessity for periodically adjusting the position of the brake pads to compensate for wear. A further problem resides in dissipating the heat generated by application of the brakes. With the known designs, the heat is transferred directly inwardly to the rotating shaft thus requiring elaborate cooling apparatus to protect the bearings and other parts of the mechanism. Moreover, a potential problem which exists in those few designs which have attempted to provide wear compensation mechanisms is the wear in the mechanism itself which ultimately renders inoperative the wear compensating mechanism.

It is an object of this invention to provide a disc brake that is self-adjusting and self-aligning.

It is a further object of this invention to provide improved cooling characteristics in a disc brake.

It is a still further object to provide a disc brake that is light in weight and cheap to manufacture.

It is another object of this invention to provide a disc brake which includes improved braking torque characteristics.

Still another object of the invention is to provide a disc brake wherein the self-adjustment mechanism includes a wear compensating device.

It is a more specific object of this invention to provide a device wherein the brake pad carrier plates are adjustable in a direction parallel to the rotating axis of the disc.

More specifically, the objects and purposes of this invention are embodied in a brake wherein there is a rotating disc and a brake unit mounted on a stationary support. As distinguished from the usual brake designs, the disc in the instant invention is a ring-like member mounted at its outer periphery on a hub member. The brake unit includes brake lining pads disposed on opposite sides of the rotating disc with each pad carried by backing plates movable relative to each other into engagement with the disc. Each of the backing plates is supported by backing plate mounts with both the backing plate and the mounts being slidably carried on the stationary support. The mounting structure for the pads and backing plates is adjacent the inner periphery of the ring disc as opposed to the typical known construction wherein the brake unit covered the outer periphery of the disc. A hydraulic operator is secured to one of the backing plate mounts and includes a piston directly operable to cause one of the backing plates to move to a position where its associated pad engages the disc. Further actuation of the operator causes the entire brake unit, including the other backing plate, to move on the stationary support in a direction opposite to and relative to the first backing plate thereby fully engaging the brake.

The support for the braking unit includes a swivel arrangement whereby the braking unit is pivotable relative to the axis of the rotating disc thus allowing the brake to compensate in alignment relative to the disc. This swivel arrangement includes swivel pins projecting from opposite ends of the brake unit and lug members secured to the projecting ends of each of the pins. The lug members are receivable in mating grooves formed in the stationary support so that the braking unit may pivot on the pins relative to the support and the unit is also capable of sliding movement in the grooves formed in the support. In addition, the support for the braking unit includes a provision to compensate automatically for the wear which is inherent in the sliding movement of the lugs in the grooves formed in the support. This automatic wear compensating mechanism comprises a spring acting between the inner ends of the swivel pins and biasing the pins to a position wherein the lugs are in engagement with the mating grooves in the support.

As to the operator for actuating the braking unit, means are provided in the cylinder whereby the return travel of the hydraulic piston is automatically varied as the brake linings decrease in thickness due to the normal wear.

Other objects and aspects of the invention will become more apparent upon a complete perusal of the specification.

Figure 2:
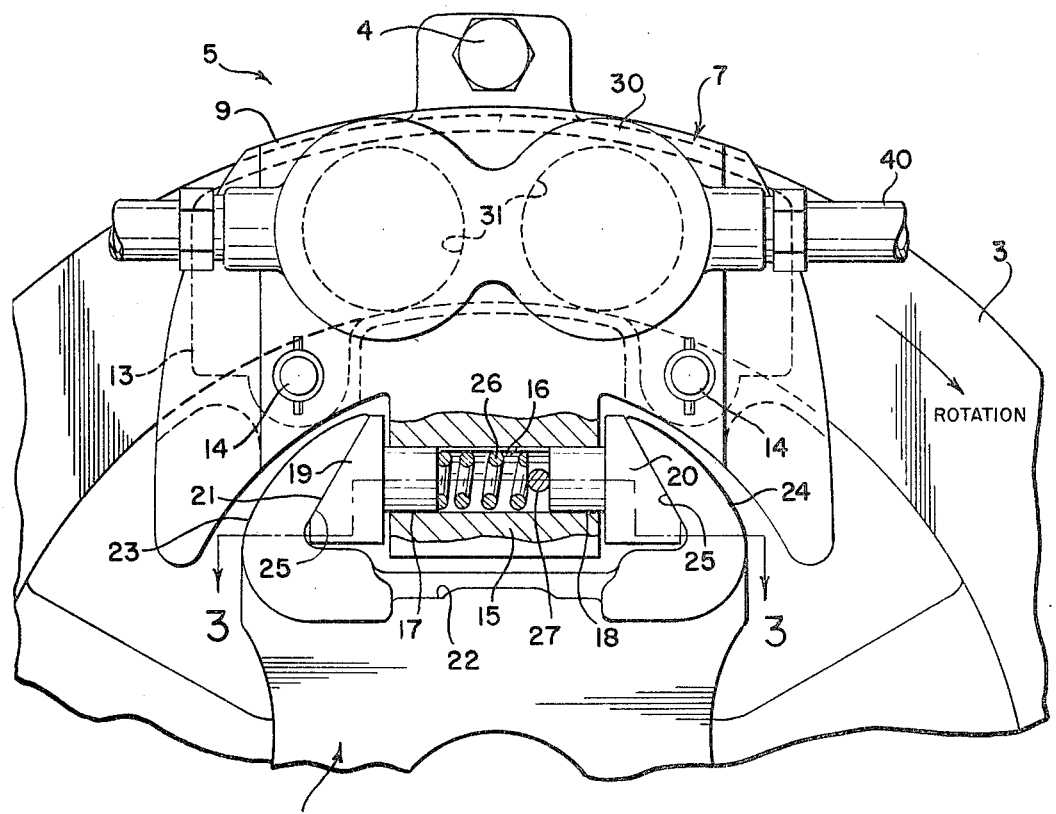
Figure 3:
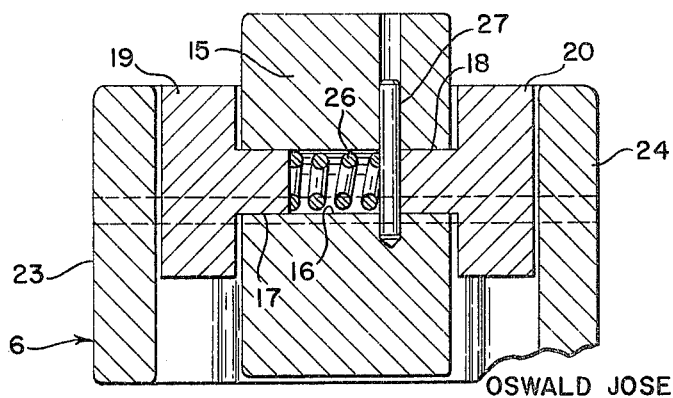

In the drawings:
FIG. 1 is a section view showing the embodiment of the brake in the disengaged position;
FIG. 2 is a partial end elevation view of the brake unit shown in FIG. 1 taken along lines 2—2 of FIG. 1;
FIG. 3 is a section view taken along line 3—3 of FIG. 2.

Referring to the drawings, FIG. 1 illustrates the preferred embodiment of our invention. A rotatable shaft 1 has secured thereto a hub 2. At the outer periphery of the hub 2 a ring disc 3 is secured by bolts 4 with spacers on the bolts 4 positioning the disc axially away from the hub 2. A brake unit generally indicated at 5 is secured to a stationary support 6.

The brake unit 5 comprises a supporting yoke or mounting member 7 having spaced apart upstanding arms 8 and 9. As shown in FIG. 1, the mount 7 is adapted to be received on the stationary support 6 with the disc 3 extending inwardly between the arms 8 and 9. Friction pads 10, 11 are mounted on backing plates 12, 13 respectively. The arms 8, 9 as well as the backing plates 12, 13 have holes in them through which carrier bolts 14 are slidably received. A loose fit between the bolts 14 and the holes is provided thereby to permit a limited amount of tilting movement of the backing plates 12 and 13. This arrangement practically eliminates any danger of the binding together of the backing plates on the bolts 14.

The support 7 includes a central portion 15 having a bore 16 passing therethrough. The longitudinal axis of the bore 16 is parallel to the plane of the rotating disc and is in substantial vertical alignment with the disc when the brake is in the position shown in FIG. 1. Adapted to be received in the aperture 16 are swivel pins or bolts 17, 18 which are rotatably received in the aperture 16 thus allowing the brake unit to rotate about the pins 17, 18 and thereby afford a swivel connection relative to the stationary support 6. Pins 17, 18 include at their outer ends lugs 19, 20 respectively. Each of the lugs, as for example lug 19, includes a bevelled or inclined surface 21. The lugs and the central portion 15 of the brake unit are adapted to be received in an open groove 22 formed in the stationary support 6. This groove is defined by spaced apart sides 23, 24 with the inner walls of the sides including outwardly converging bevelled surfaces 25 adapted to mate with the corresponding inclined surfaces on the lugs 19, 20. Thus, as shown in FIG. 2, the lugs are in mating engagement with the inclined surfaces 25 of the groove 22 thereby providing a slideway or guide for the sliding movement of the brake unit relative to the brake disc.

To assure the guided engagement of the lugs 19, 20 with the inclined surfaces 25 in the groove 22, there is provided a spring 26 which is received within the bore 16. Also extending into the bore 16 is a pin 27 which serves as a stop or abutment for the inner end of the pin 18. One end of the spring 26 bottoms or rests against the pin 27 with the opposite end of the spring engaging the inner end of the pin 17. It is readily apparent that the resilience of the spring 26 biases the lug 19 against the side 23 in one direction and acts in the other direction to bias the entire brake unit to a position wherein the lug 20 is in engagement with the side 24 of the stationary support 6. As a result, any wear which may occur between the lugs 19, 20 and the groove 22 is compensated for by the resilence of the spring 26 so that a loose fit between the parts will not occur.

The location of the pin 27 is dependent upon the direction of rotation of the ring disc 3. As shown in FIG. 2, during the braking process, the ring disc 3 will be rotating in a clockwise direction thereby tending to shift the brake unit 5 to the right along the swivel bolt 18. This tendency, if not restrained, causes undesirable noise and rattle as well as consequent wear of the relatively shifting parts. The pin 27 provides a positive abutment which prevents any shifting movement and thereby eliminates the possible noise and wear. If the disc 3 in FIG. 2 is to rotate in the counterclockwise direction, it will be understood that the pin 27 should be associated with the end of the bolt 17.

As an actuator for the brake unit, a fluid pressure cylinder 30 is secured to the supporting mount 7. As shown in FIG. 2, a pair of cylindrical openings 31 are formed in the arm 9 through which a pair of pistons 32, only one of which is shown in FIG. 1, are adapted to pass and abut the backing plate 13. In the area of the piston 32 adjoining the rear surface 33 thereof, a groove 34 is provided. Disposed in the groove 34 is an oil pressure sealing gasket 35. Adjacent to the groove 34 but longitudinally spaced therefrom is a second groove 36. Disposed in the groove 36 is a coil spring 37 having one end abutting the piston collar 38 and the other end abutting a retaining ring 39. The retaining ring 39 is a press fit within the cylinder bore and acts as a retainer abutment for the spring 37 regardless of the position of the piston 32.

The design of the spring 37 together with the retaining ring 39 functions not only as a means for disengaging the brake but also as an automatic wear compensator. Thus, as fluid pressure is introduced into the piston chamber against the surface 33 of the piston 32, the piston will be moved in a direction to compress the spring. The piston 32 will project outwardly of the chamber and abut the backing plate 13 and thereby cause engagement of the friction pad 11 with the disc 3. As the brake pads become worn and the distance increases between the pads and ring disc 3, in the disengaged position of the brake, the amount of movement required for the brake pads to engage the disc also increases. By selecting the spring 37 with an appropriate solid height less than the thickness of the brake pads, it will be necessary to displace the retaining ring 39 in order to engage the pads with the disc after wear of the pads exceeding the solid height has occurred. Once the retaining ring has been displaced and is securely frictionally gripped in a new position relative to its normal position, the piston 32 will no longer be retracted fully within the chamber but rather, will protrude an amount equal to the displacement of the ring 39. It will be readily apparent that the periodic displacement of the retaining ring effects an adjustment of the piston 32 so that for a given displacement of the piston, continued engagement of the pads with the ring is assured throughout the full life of the brake pads.

In operation, assuming clockwise rotation of the disc 3 as viewed in FIG. 2, hydraulic fluid is introduced through conduit 40 causing the pistons 32 to pass through the openings 31 in the support arm 9 and abut the backing plate 13. Further fluid pressure causes the piston 32 to move the plate 13 and its attendant friction pad 11 in the direction of the disc 3 until the pad 11 has frictionally engaged the surface of the disc 3. Further pressure exerted by the operator is ineffective to move the piston 32 and backing plate 13 with the result being that the fluid cylinder, the supporting member 7 and the backing plate 12 are displaced through sliding movement of the lugs 19, 20 in the groove 22 until the friction pad 10 engages the surface of the ring disc 3 opposite to the surface engaged by the friction pad 11. In this manner, both the horizontal mutual shifting of the individual parts of the brake unit and the shifting of the brake unit itself is accomplished on the carrier bolts 14 as well as on the lugs 19, 20 in the groove 22.

In view of the loose fit between the bolts 14 and the holes 13, together with the resilient engagement between the lugs and the groove 22, it is practically impossible for the individual parts of the brake to bind. Also, it is possible for the backing plates 12, 13 to effect independent movement relative to each other. This again will assist in the proper frictional contact of the brake pads against the ring disc. Finally, due to the swivel mounting pins, the entire brake unit 5 is free to adjust itself to the position of the ring disc 3 and thus assure full frictional engagement of the linings with the ring disc 3.

Upon exhaust of the hydraulic pressure from the chamber, the piston 32 will be returned to its resting position shown in FIG. 1 by virtue of the spring 37 reacting between the collar 38 and the retaining ring 39.

Aside from the self-aligning nature of the disclosed brake, several additional features should be noted. By using an annular disc instead of mounting the disc directly on the hub in the form of a plate, improved cooling is obtained. Just as the ring disc 3 is only indirectly connected through bolts 4 and the hub 2 to the shaft 1, so also any heat generated by the braking action must travel the same tortuous route before reaching any critical shaft bearings. Obviously, considerable dissipation of the heat occurs by virtue of this arrangement.

Another point directly related to the cooling features should be emphasized. The utilization of a ring disc permits the support structure for the brake pads and backing plates to be located inside of the disc. For a given space, this arrangement allows utilization of a disc having a greater diameter than was possible with the prior art. Thus, the disc in the instant arrangement may extend to the extreme outer periphery of the encasing structure whereas the diameter of the plate disc of the prior art is limited by the brake pad mounting structure being positioned between the casing and the outer periphery of the disc. With a disc of greater diameter, it is possible to have the brake pads engage the disc at a greater radial distance from the shaft and thereby to require a lower braking effort for a given level of torque. Obviously, the heat generated is related to the braking force required so that a lower level of braking effort will produce less heat which in turn will lower the cooling requirements. It also should be noted that a decrease in generated heat will have a considerable effect on increasing the life of the brake pads.

Although the present invention has been described in connection with but a single illustrated embodiment, variations and modifications may be resorted to by those skilled in the art without departing from the principles of the invention. All of these variations and modifications are considered to be within the true scope and spirit of the present invention as disclosed in the foregoing description and defined by the appended claims.

We claim:
1. In a disc brake, the combination comprising:
a rotatable shaft;
a hub secured to said shaft;
a ring disc spaced from and secured at its outer periphery to said hub;
a stationary member;
a braking unit comprising a support having primary and secondary braking elements disposed on opposite sides of said disc;
means supporting said braking unit on said stationary member for slidable and swivelling movement relative thereto;
said last-mentioned means comprising a pair of coaxial swivel bolts rotatably received in and projecting from either end of said brake unit with the longitudinal axis of said bolts being parallel to the plane of said rotatable disc;
means on said stationary member in engagement with the projecting ends of said bolts supporting said bolts for slidable movement toward and away from said disc;
biasing means operatively associated with said swivel bolts to maintain said bolts in engagement with said slidable supporting means on said stationary member; and
an actuator operable to cause progressive engagement of said primary element and said secondary element with said disc.

2. The brake of claim 1 wherein each of said primary and secondary braking elements are movably mounted on said braking unit support.

3. In a disc brake, the combination comprising:
a rotatable shaft;
a hub secured to said shaft;
a ring disc spaced from and secured at its outer periphery to said hub;
a stationary member;
a brake unit movably carried by said stationary member and comprising spaced apart primary and secondary elements adapted to engage opposite sides of said ring disc;
swivel means supporting said braking unit on said stationary member for slidable and swivelling movement relative thereto;
said swivel means comprising a pair of coaxial swivel bolts rotatably received in and projecting from either end of said brake unit;
means on said stationary member in engagement with the projecting ends of said bolts supporting said bolts for slidable movement in the direction of the plane of said disc; and
resilient means associated with said swivel bolts operative to bias said bolts into engagement with said slidable supporting means on said stationary member.

4. The brake of claim 3 wherein each of said primary and secondary braking elements is movable relative to said brake unit.

5. The brake of claim 3 and further including:
support means for said primary and secondary braking elements;
said support means passing through said ring disc radially inwardly of the inner periphery of said disc.

6. In a disc brake, the combination comprising:
a rotatable shaft;
a hub secured to said shaft;
a ring disc secured to said hub;
a stationary member;
a brake unit comprising a support;
primary and secondary friction pads on said support and being adapted to engage opposed surfaces on said ring disc;
means mounting said support for sliding and swivelling movement relative to said stationary member;
said mounting means including a bore passing through a portion of said support;
swivel bolts received in opposite ends of said bore;
each of said swivel bolts including an enlarged lug having a bevelled surface thereon;
a groove formed in said stationary member;
the walls of said groove including opposed bevelled surfaces with the angle of the bevel on said walls being substantially equal to the angle of the bevel on said enlarged lug whereby said lugs are slidably engaged in said groove; and
biasing means operative to maintain the engagement of said lugs with the bevelled walls of said groove.

7. The brake of claim 6 wherein said biasing means comprises a spring received in said bore in said mounting means intermediate the inner ends of said swivel bolts.

8. The brake of claim 7 and including:
a pin extending into said bore in said mounting means transverse to the longitudinal axis of said bore;
said pin being disposed between the inner end of one of said bolts and the adjacent end of said spring.

References Cited by the Examiner

UNITED STATES PATENTS 2,655,229   10/1953   Eksergian _____ 188—73 X

FOREIGN PATENTS 1,129,639   9/1956   France.
1,267,299   6/1961   France.

MILTON BUCHLER, *Primary Examiner.*

G. E. A. HALVOSA, *Assistant Examiner.*